Sept. 15, 1925
L. W. CHUBB
MEANS FOR PRODUCING HIGH VOLTAGE
Filed Dec. 7, 1920
1,553,363
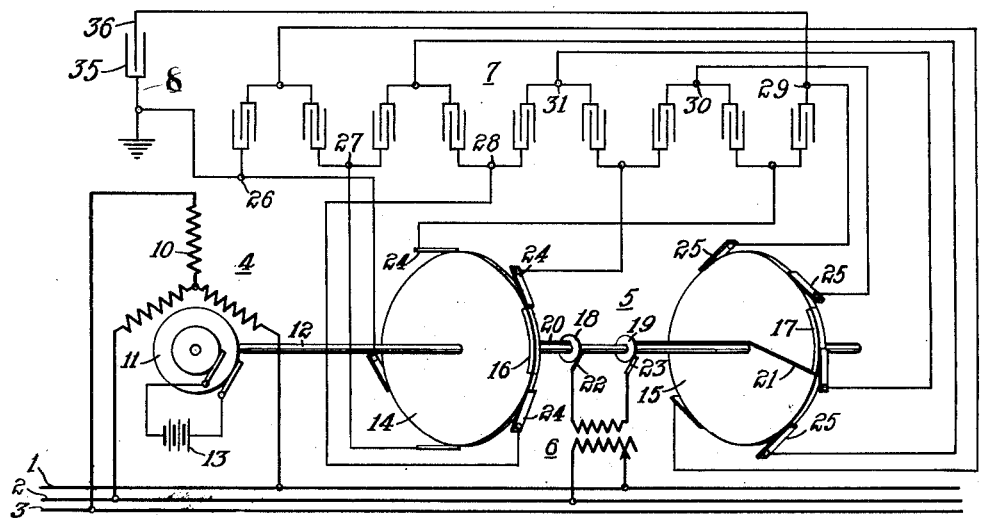
Fig. 1.
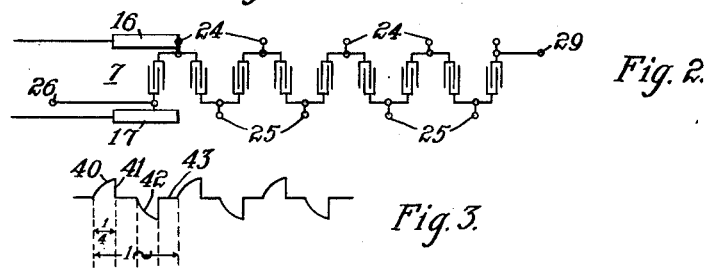
Fig. 2.
Fig. 3.
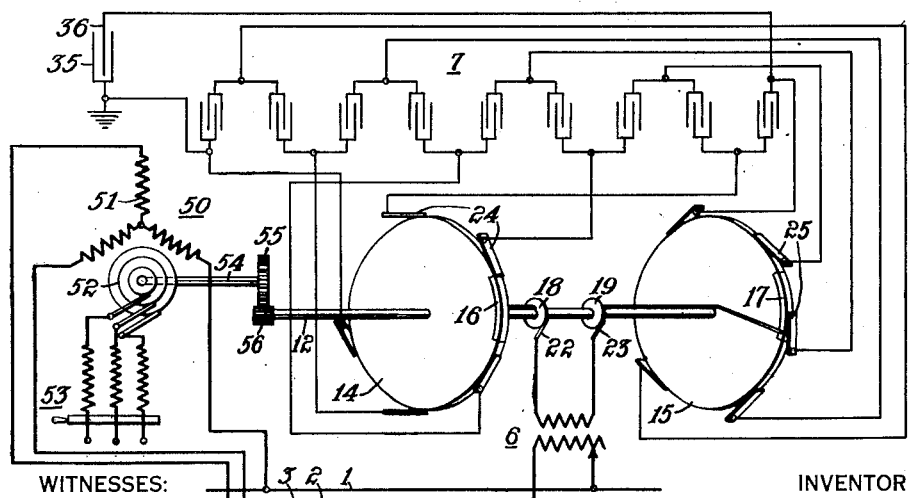
Fig. 4.
WITNESSES:
V. J. Shelhamer
W. R. Coley
INVENTOR
Lewis Warrington Chubb
BY
Wesley G. Carr
ATTORNEY Patented Sept. 15, 1925.

1,553,363

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MEANS FOR PRODUCING HIGH VOLTAGE.

Application filed December 7, 1920. Serial No. 428,884.

*To all whom it may concern:*

Be it known that I, LEWIS WARRINGTON CHUBB, a citizen of the United States, and a resident of Edgewood Park, in the county of Allegheny and State of Pennsylvania, have invented a new and useful Improvement in Means for Producing High Voltage, of which the following is a specification.

My invention relates to means for producing high voltage and it has special relation to the production of high unidirectional voltages, such as are adapted for use in precipitating apparatus, ozonizers, X-ray tubes, radio communication and the like.

In the prior art, various apparatus has been devised employing direct-current energization, whereby a plurality of energy-storing-and-restoring units, such as condensers connected in series relation, have been successively charged and have been subsequently discharged. However, so far as I am aware, no alternating-current apparatus of this type has been devised.

One object of my invention, therefore, is to provide an apparatus of the above-indicated character, which shall employ alternating-current energization, whereby, through the use of a step-up transformer, higher direct-current voltages than have previously been available may readily be secured.

Another object of my invention is to provide means of the class in question for supplying energy that is derived from a low-voltage source of fixed frequency to a series of energy-storing-and-restoring units at any desired frequency.

Other and more specific objects of my invention will become evident from the following detailed description taken in conjunction with the accompanying drawings wherein—

Figure 1 is a diagrammatic view of a system and apparatus organized and constructed in accordance with one form of my invention;

Fig. 2 is a diagrammatic view in development of a portion of the system that is shown in Fig. 1;

Fig. 3 is a curve chart illustrating the type of voltage curve that is supplied to the series of condensers by my apparatus; and Fig. 4 is a diagrammatic view of a modified form of my invention.

Referring to Fig. 1, the system here shown comprises a suitable alternating-current circuit, which is preferably of the three-phase type comprising conductors 1, 2 and 3 for supplying energy to a synchronous motor 4. The motor 4 is adapted to drive a rotative charging apparatus 5, which derives its energy from the supply circuit conductors 1 and 2, for example, by means of a step-up transformer 6. A set of energy-storing-and-restoring units 7, here shown, for purposes of illustration, as condensers, are connected in series relation with a consumption device 8, which may be, for example, an electric precipitator.

The synchronous motor 4 comprises a three-phase primary winding, or stator 10 and a co-operating field winding, or rotor 11, which is mounted upon a driving shaft 12. A suitable source of direct-current energy, such as a battery 13, is provided for energizing the field winding 11, in accordance with customary practice. The synchronous motor 4, in the particular case illustrated, is of the twelve-pole type to provide the proper speed for the rotative charging apparatus 5, as subsequently explained in detail.

The apparatus 5 is shown as comprising a pair of discs, or cylinders 14 and 15 of insulating material, which are rigidly fastened to the driving shaft 12 and are respectively provided with contact segments 16 and 17 that cover a predetermined fraction of their circumference. A plurality of suitably insulated slip-rings 18 and 19 are rigidly mounted upon the shaft 12 intermediate the discs 14 and 15 and are respectively connected to the contact segments 16 and 17 by means of conductors 20 and 21.

The transformer 6 may be adapted to provide any desired multiplication of the supply-circuit voltage by suitable variation of its primary-winding connections, as will be readily understood. The secondary winding of the transformer is connected, through suitable brushes 22 and 23, to the slip-rings 18 and 19, whereby the rotatable contact segments 16 and 17 are respectively connected to the opposite terminals of the transformer winding.

A plurality of brushes or control fingers 24 are spaced around the rotatable disc 14, while corresponding brushes 25 are located, in staggered relation to the brushes 24, around the circumference of the other rotatable disc 15.

In the illustrated case, five brushes 24 are provided, being spaced apart approximately one-sixth of the circumference of the disc 14, thus leaving a relatively long space between two of the brushes that respectively correspond to the opposite ends of the series-connected set of condensers 7.

The contact segment 16 is of a length approximately three-fourths of the arcuate distance between the successive brushes 24, that is, three-fourths times one-sixth, or approximately one-eighth of the circumference of the disc 14. The purpose of this particular proportion of parts will become evident from the subsequent description.

It will be understood that any desired number of condensers 7 may be employed, depending upon the voltage transformation that is required between the secondary winding of the transformer 6 and the high-voltage delivery circuit. The number of brushes in the rotatable charging apparatus 5 will, of course, vary in accordance with the number of condenser units that are employed.

One of the brushes 24 is connected directly to one end of the series condenser circuit, that is to say, to one terminal conductor 26 of the high-voltage circuit. The remaining brushes, taken in a counter-clockwise direction, are connected between the second and third condenser units, the fourth and fifth condenser units, etc., as indicated by the tap-points 27 and 28.

The equal number of brushes 25 for the disc 15 are arranged in a complementary manner, that is, one brush 25 is connected to the right-hand terminal of the condenser circuit, that is, to the terminal conductor 29 of the high-voltage circuit, while the remaining brushes, taken in a clockwise direction, are connected between the eighth and seventh condenser units, the sixth and fifth condenser units, etc., as indicated by the tap-points 30 and 31, for example.

As previously stated, the high unidirectional voltage that is delivered to the terminal conductors 26 and 29 may be employed in connection with a precipitation device, such as that illustrated at 8, comprising a grounded electrode 35 and a second co-operating electrode 36.

In the illustrated case the rotative charging apparatus, by reason of the number and spacing of the contact brushes, is rotated at one-sixth of the two-pole synchronous speed. In other words, a twelve-pole synchronous motor 4 will provide the desired speed of operation. The developed view of Fig. 2 and the corresponding curve chart, Fig. 3, will serve to make clear the sequence of operation during the charging of the condenser units 7.

In the position shown in Fig. 2, contact segment 16 begins contact with the first brush 24 at the instant that the alternating-current voltage in the secondary winding of the transformer 6 is zero, as indicated by the curve or graph in Fig. 3. This contact continues for approximately one-fourth of a cycle, by reason of the above-described proportion of parts and rotative speed of the charging apparatus, at which time the first, or left-hand, condenser 7 in Fig. 2, is charged to the peak value of the voltage, as indicated by the portion 40 of the curve in Fig. 3. At this instant the contact segment 16 leaves the first brush 24 and the circuit is open for one-fourth of a cycle, as indicated by the straight line portion 41 of the curve in Fig. 3.

The next contact thus begins at zero voltage when the other contact segment 17 engages the second brush 25. This contact continues until an effective maximum voltage value is obtained, as indicated by curve portion 42, to charge the second condenser 7 in the opposite direction. Another open-circuit then obtains for one-quarter of a cycle, as indicated by portion 43 of the graph.

The actions just described are repeated as the rotative charging apparatus is operated until all of the condensers 7 have been successively charged. It will be noted that, by reason of the particular connections of the condenser units 7 with respect to the contact segment 17 and the corresponding brushes, the condenser units are cumulatively charged, although the voltage peaks, as indicated in Fig. 3, are alternately positive and negative. Consequently, the total or cumulative effect of all the condenser voltages is adapted to be discharged through the high-voltage terminal conductors 26 and 29.

In this way, a relatively low-voltage alternating-current circuit may have its voltage transformed to any desired relatively high value and this increased voltage is successively applied to a series-related set of condenser units to ultimately produce very high unidirectional voltage for the desired purpose. By reason of the continuous repeating effect of the rotative charging apparatus 5, this high voltage is continuously supplied to the consumption device 8. This effect is particularly desirable in the case of treatment of gases containing valuable elements to be salvaged by precipitation, as will be understood.

Referring to Fig. 4, the apparatus here shown comprises the supply circuits, my rotatable charging apparatus 5, the step-up transformer 6, the series of energy-storing-and-restoring units 7 and the consumption device 8, as previously described.

However, to provide a desirable speed regulation of the charging apparatus 5, an induction motor 50 is provided for driving the shaft 12. The induction motor 50 comprises a three-phase, twelve-pole primary winding, or stator 51 and a wound rotor 52, with which is associated a suitable polyphase variable resistor 53 for speed-regulating purposes, in accordance with a familiar practice.

The rotor 52 is rigidly mounted upon a shaft 54, to one end of which a gear-wheel 55 is secured to mesh with a pinion 56 that is mounted upon the driving shaft 12. The ratio between the speeds of the gear-wheel 55 and the pinion 56 may be two to one, for example, if it is desired to vary the speed of the rotative charging apparatus from zero to approximately twice the synchronous speed that is obtained by the apparatus shown in Fig. 1.

It will be understood, however, that any other desired ratio, or, in fact, any other means for effecting the desired speed regulation of the driving shaft 12, may be employed.

The present apparatus is adapted to deliver a variable frequency to the set of condenser units 7. By adjusting the amount of active secondary resistance 53, the speed of the driving shaft 12 may be regulated, as desired, between zero and the above-mentioned synchronous speed. Such regulation results in making and breaking the contact between the contact segments 16 and 17 and the corresponding sets of brushes 24 and 25 at progressively different points in the voltage wave. Consequently, the series of condenser units will be supplied with a terminal voltage of a frequency corresponding to that of the driving shaft 12; that is, a frequency varying inversely with the degree of slip of the induction motor 50.

I do not wish to be restricted to the specific circuit connections, structural details, or arrangement of parts herein set forth, as various modifications may be made therein without departing from the spirit and scope of my invention. I desire, therefore, that only such limitations shall be imposed as are indicated in the appended claims.

I claim as my invention:

1. The combination with a low-voltage source of alternating-current and a high-voltage unidirectional consumption device, of a plurality of energy-storing and restoring units connected in series relation, a plurality of sets of contact members disposed in staggered relation with respect to each other, means for connecting said members between successive pairs of said energy-storing units, a plurality of alined and simultaneously operating contact segments for successively engaging the respective members of each set, and a plurality of slip-rings for connecting said segments to the respective terminals of said source.

2. The combination with a low-voltage source of alternating-current and a high-voltage unidirectional consumption device, of a plurality of energy-storing and restoring units connected in series relation, a plurality of sets of stationary contact members, said sets having their members connected between successive pairs of said energy-storing units, a plurality of contact segments for the respective sets, each segment being approximately equal to ¾ of the distance between said contact members, and means for connecting said segments to the respective terminals of said alternating-current source.

3. The combination with a low-voltage source of alternating-current and a high-voltage unidirectional consumption device, of a plurality of energy-storing and restoring units connected in series relation, a plurality of sets of stationary contact members, said sets having their members connected between successive pairs of said energy-storing units and disposed in staggered relation, a plurality of rigidly associated contact segments for the respective sets, each segment being approximately equal to ¾ of the distance between said contact members, a plurality of slip-rings for connecting said segments to the respective terminals of said source, and means for operating said segment at a predetermined speed.

In testimony whereof I have hereunto subscribed my name this 30th day of November, 1920.

LEWIS WARRINGTON CHUBB.